TELEVISION RECEIVER

Filed Nov. 18, 1954 2 Sheets-Sheet 1

INVENTOR.
William K. Squires
BY
Mason, Kolehmainen, Rathburn & Wyss,
Attys

INVENTOR.
William K. Squires
BY Mason, Kolehmainen, Rathburn & Wyss, Attys 2,810,014

TELEVISION RECEIVER

William K. Squires, Snyder, N. Y., assignor to Sylvania Electric Products, Inc., a corporation of Massachusetts Application November 18, 1954, Serial No. 469,640

14 Claims. (Cl. 178—5.8)

Figure 1:
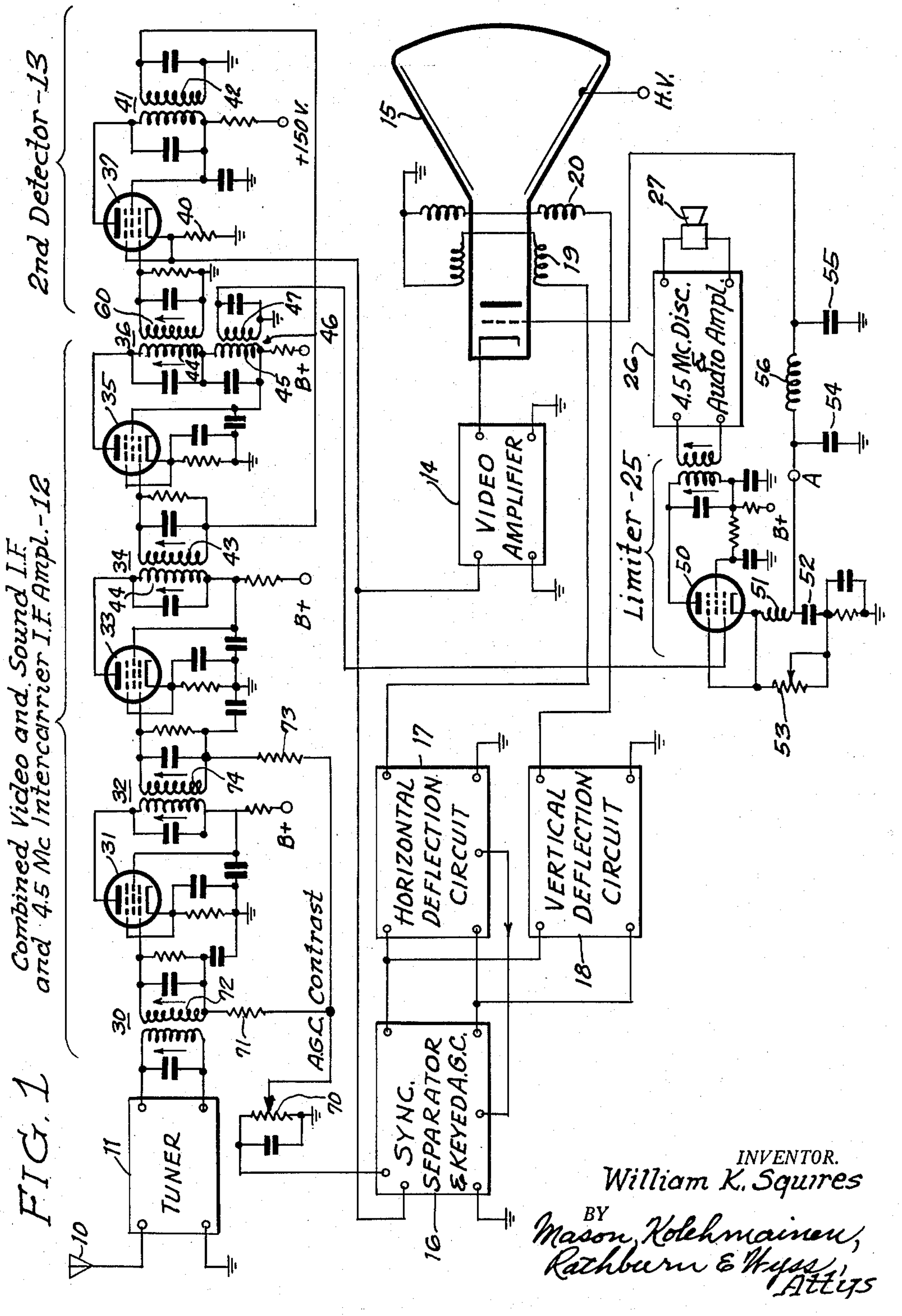

The present invention relates to television receivers, more particularly to television receivers of both the monochrome and polychrome types, and the invention has for an object the provision of a new and improved television receiver of either of the above described types wherein certain portions of a conventional receiver are eliminated so that the cost of the receiver is substantially reduced while providing a reproduced picture of good detail and quality.

In both monochrome and polychrome conventional television receivers it is customary to provide a common I. F. channel for both the video and sound carriers, these carriers under present television standards being separated by 4.5 mc., and an intercarrier sound I. F. signal is produced by heterodyning the video and sound carriers in the second detector stage of the receiver. In such receivers it is necessary to provide some amplification of the 4.5 mc. intercarrier sound signal before deriving the sound modulation therefrom. While certain prior art arrangements have employed the video amplifier stages which follow the second detector to provide the necessary gain for the 4.5 mc. intercarrier sound signal, these arrangements have required trap circuits with a high degree of attenuation at 4.5 mc. to prevent an undesired cross-hatch pattern from appearing in the reproduced picture due to the 4.5 mc. component. These trap circuits inherently cause a large amount of phase distortion of the other frequency components of the video signal and produce overshoot and ringing effects in the later stages with the consequence that blurring of the fine detail of the picture is inherently produced. In my copending application Serial No. 464,991, filed on October 27, 1954, and assigned to the same assignee as the present invention, there is disclosed an arrangement for preventing phase distortion of the video signal while removing the objectionable 4.5 mc. beat note component. This is accomplished by amplifying the 4.5 mc. signal through two separate amplifier channels and combining the outputs of these channels in the correct phase to produce cancellation of the 4.5 mc. signal without introducing phase distortion of the other frequency components of the video signal. While the arrangement disclosed in my above identified copending application is entirely satisfactory for its intended purpose, it would be desirable to provide an arrangement wherein the advantages of cancellation of the 4.5 mc. intercarrier sound signal are obtained without requiring additional 4.5 mc. amplifier stages in the receiver.

In conventional color television receivers it is also necessary to provide substantial amplification for the color subcarrier modulation components, this subcarrier under present television standards being assigned a frequency of 3.58 mc. This amplification is normally obtained by providing a separate so-called chroma amplifier which has a limited band pass characteristic such that the amplifier transmits signals only in the frequency range of from 2 to 4. mc., i. e., a sufficient band width to transmit the upper and lower side bands of the 3.58 mc. color subcarrier. The output of this chroma amplifier is connected to the color demodulators of the receiver and the outputs of the color demodulators are matrixed with the luminance video signal to provide the required red, blue and green color signals. The chroma amplifier usually requires two separate amplifier stages to provide sufficient amplification for the color subcarrier signal before it is applied to the color demodulators and it would be desirable to provide an arrangement whereby a suitable amplitude color subcarrier signal could be obtained without requiring additional amplifier stages in the color television receiver. Furthermore, it would be desirable to provide such a simplified color television arrangement wherein no trap circuits are required in the luminance video channel for the 3.58 mc. color subcarrier signal so that phase distortion is not introduced when the 3.58 mc. signal is eliminated. In this connection it will be understood that the 4.5 mc. intercarrier sound signal and the 3.58 mc. color subcarrier signal can produce an objectionable 920 kilocycle beat note component if they are transmitted through any non-linear element of the receiver, as described in more detail above in my copending application Serial No. 464,991, identified above.

It is, therefore, another object of the present invention, to provide a new and improved television receiver of either the monochrome or polychrome type, wherein dual channel amplification of the 4.5 mc. intercarrier sound signal is provided without requiring separate amplifier stages for this purpose.

It is a further object of the present invention to provide a new and improved television receiver of either the monochrome or polychrome type wherein substantial amplification of the 4.5 mc. intercarrier sound signal is obtained from the common video and sound carrier I. F. channel of the receiver, while at the same time providing an arrangement whereby the video signal level may be adjusted for contrast control purposes without changing the gain of the double path 4.5 mc. system and while maintaining cancellation of the 4.5 mc. intercarrier signal to prevent this signal from appearing in the reproduced picture.

It is another object of the present invention to provide a new and improved television receiver of either the monochrome or polychrome type, wherein a 4.5 mc. intercarrier sound signal is amplified through at least a portion of the common video and sound carrier I. F. channel of the receiver.

It is a further object of the present invention to provide a new and improved color television receiver wherein the color subcarrier signal is amplified through at least a portion of the common video and sound carrier I. F. channel of the receiver to provide a substantially simpler and more economical color television receiving arrangement.

It is a still further object of the present invention to provide a new and improved color television receiver of the intercarrier sound type wherein both the 4.5 mc. intercarrier sound signal and the 3.58 mc. color subcarrier signal are amplified through at least a portion of the common video and sound carrier I. F. channel of the receiver without interaction between these signals so that a substantially simpler and more economical color television receiver is provided.

It is a still further object of the present invention to provide a new and improved color television receiver wherein the color subcarrier signal is amplified through at least a portion of the common video and sound carrier I. F. channel of the receiver, while at the same time, providing an arrangement whereby the overall video signal level may be adjusted for contrast control purposes without introducing interaction between the color subcarrier signal and the signals transmitted through said common channel.

It is another object of the present invention to provide a new and improved color television receiver wherein the color subcarrier signal is amplified through at least a portion of the common video and sound carrier I. F. channel of the receiver, while at the same time providing an arrangement whereby the overall video signal level may be adjusted for contrast control purposes without changing the gain of the color subcarrier signal and while maintaining cancellation of the color subcarrier from the reproduced picture.

Briefly, in accordance with one phase of the invention the television receiver, which may be of either the monochrome or the polychrome type, is provided with a second detector circuit arrangement whereby a 4.5 mc. intercarrier sound I. F. signal is developed which is separate from and independent of the detected video signal. This 4.5 mc. intercarrier signal is reflex amplified through one or more of the I. F. stages in the common video and sound I. F. channel of the television receiver and the amplified 4.5 mc. intercarrier signal is then coupled directly to an amplitude limiter and frequency discriminator so as to recover the sound signal which accompanies the received picture signal. With this arrangement, the 4.5 mc. intercarrier signal is amplified to the correct level without producing interaction with the other signals amplified in the common video and sound I. F. channel and without requiring additional tubes in the receiver. In accordance with a further feature of the invention, a 4.5 mc. cancellation signal is derived from the amplitude limiter stage which is of the same amplitude and of the correct phase to cancel the 4.5 mc. intercarrier beat note component which is inherently produced in the picture signal derived from the second detector of the receiver. This cancellation signal is then mixed with the picture signal so as to remove the undesired 4.5 mc. beat note component without introducing phase distortion at any point within the video amplifier channel. In order to adjust the amplitude of the video signal for contrast control purposes, while maintaining cancellation of the 4.5 mc. beat note component, an AGC voltage is impressed only upon the stages of the common video and sound I. F. channel which are not used for reflex amplification of the 4.5 mc. signal so that the gain of the reflex stage remains constant and the amplification of the 4.5 mc. signal through two independent signal paths remains constant while permitting contrast variation.

In the case of a color television receiver, a further simplification of the receiver is achieved in accordance with the present invention by amplifying the 3.58 mc. color subcarrier signal through one or more of the I. F. stages of the common video and sound I. F. channel of the receiver, the color subcarrier output of these reflex amplifier stages being directly connected to the color demodulator stages of the receiver. Furthermore, a 3.58 mc. cancellation signal may be derived from the output of the reflex amplifier stages and may be employed to remove the 3.58 mc. color subcarrier component from the luminance picture signal without producing phase distortion of the other frequency components of the luminance signal. Preferably, both the 4.5 mc. intercarrier signal and the 3.58 mc. color subcarrier signal are reflex amplified through the same I. F. stages of the common video and sound I. F. channel of the receiver so as to permit all of the other I. F. stages of the common video and sound I. F. channel to be controlled by an AGC voltage so that overloading and cross-modulation between the signals amplified through the reflex amplifier stages is avoided.

Figure 2:
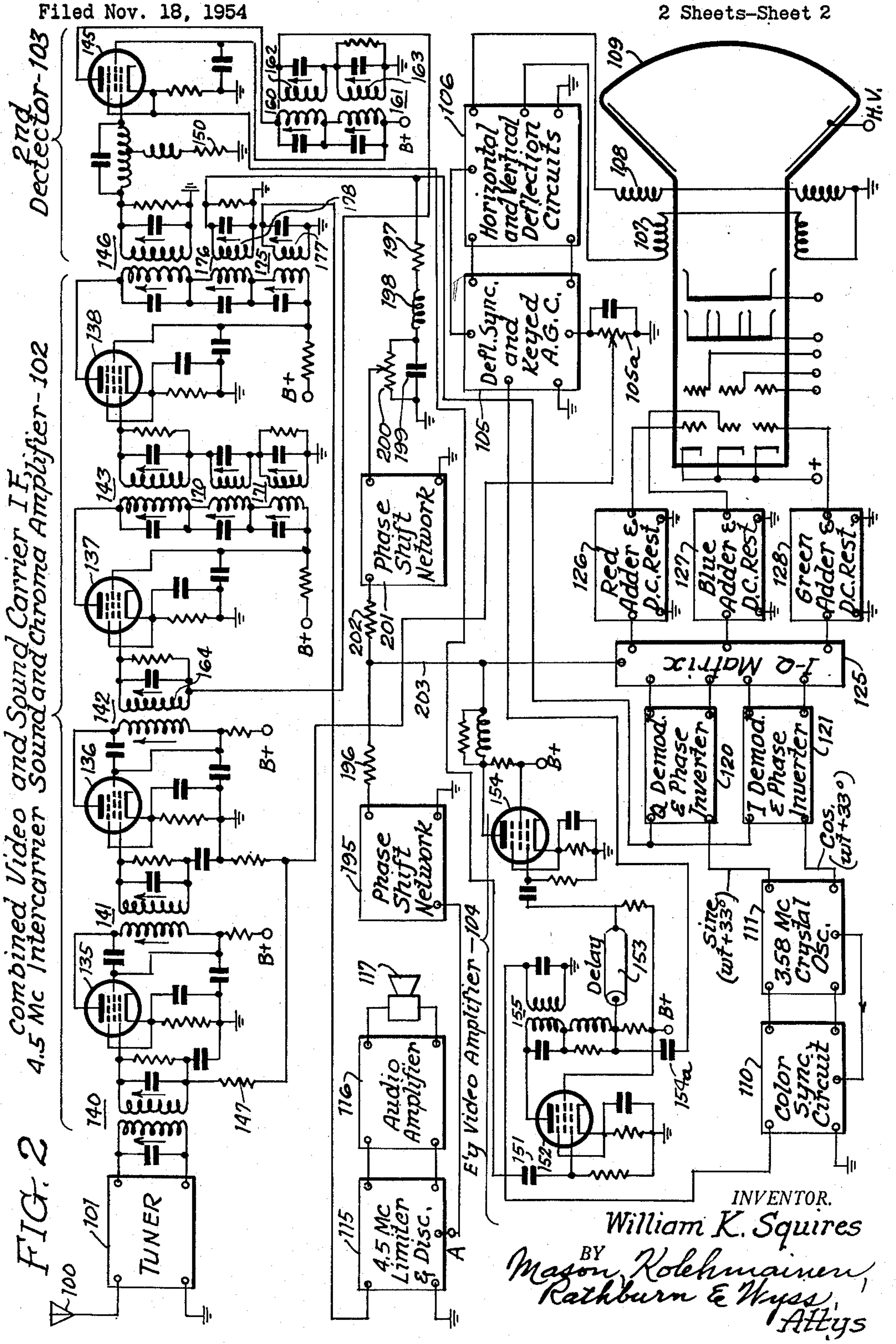

For a better understanding of the present invention reference may be had to the accompanying drawings in which:

Fig. 1 of the drawings is a schematic diagram, partly in block diagram form, of a monochrome television receiver embodying the features of the present invention; and Fig. 2 of the drawings is a schematic diagram, partly in block diagram form, of a color television receiver embodying the features of the present invention.

Referring now to Fig. 1 of the drawings, the system illustrated therein comprises a modulated carrier wave monochrome television receiver of the superheterodyne type including an antenna system 10 connected to a tuner 11 to which are connected in cascade relation in the order named, a combined video and sound I. F. and 4.5 mc. intercarrier amplifier 12, a second detector 13, a video amplifier 14 and a cathode ray tube viewing device 15. A sync separator and keyed AGC circuit 16 is connected to the output of the second detector 13 and supplies separated horizontal and vertical synchronizing signals to a horizontal deflection circuit 17 and a vertical deflection circuit 18, the circuits 17 and 18 developing suitable scanning waves in the horizontal deflection coils 19 and the vertical deflection coils 20 which surround the neck of the cathode ray tube 15. In accordance with the present invention, a 4.5 mc. intercarrier sound I. F. signal is derived from the second detector 13 and is impressed upon the common video and sound I. F. amplifier 12 of the receiver so that substantial amplification of the 4.5 mc. signal is obtained in this amplifier without interfering with the intermediate frequency signals transmitted through the amplifier 12. The amplifier 4.5 mc. signal derived from the amplifier 12 is coupled to an amplitude limiter circuit 25 which removes amplitude variations from the frequency modulated 4.5 mc. intercarrier sound I. F. signal, the output of a limiter 25 being coupled to a 4.5 mc. discriminator and audio amplifier 26 wherein the sound signals are derived from the 4.5 mc. intercarrier sound I. F. signal and are supplied to the loudspeaker 27 of the television receiver. Preferably, the limiter 25 also provides a 4.5 mc. cancellation signal which is impressed upon the control grid of the cathode ray tube 15 for reasons to be described in more detail hereinafter.

The units 10, 11, 14, to 19, inclusive, 26 and 27 may all be of conventional well-known construction so that a detailed description thereof is considered unnecessary herein. Referring briefly, however, to the operation of the above-described system as a whole, television signals intercepted by the antenna circuit 10 are applied to the tuner 11 wherein they are converted into corresponding intermediate frequency signals which are suitably amplified in the common video and sound I. F. and 4.5 mc. intercarrier I. F. amplifier 12, the output of the amplifier 12 being impressed upon the second detector 13. The video signal developed in the second detector 13 is applied to the video amplifier 14 wherein it is amplified to a suitable level and applied to the cathode of the picture tube 15 to control the intensity of the electron beam thereof. The synchronizing signal portions of the composite television signal are also coupled from the second detector 13 to the sync separator and keyed AGC circuit 16 so as to synchronize the horizontal and vertical scanning waves developed in the coils 19 and 20 by the deflection circuits 17 and 18, respectively.

Referring now more particularly to the portions of the receiver of Fig. 1 which embody the features of the present invention, the intermediate frequency signal developed by the tuner 11 is coupled through an interstage coupling transformer 30 to the control grid of the first amplifier tube 31 in the amplier 12. In this connection it will be understood that the intermediate frequency signals supplied by the tuner 11 include a video carrier which is amplitude modulated by the video signal derived from the transmitter pick-up tube and a sound carrier which is frequency modulated by the sound signals which accompany the picture signal, the video and sound carriers being separated by a fixed frequency difference of 4.5 mc. according to present television standards. The video and sound I. F. signals are commonly amplified in the tube 31 and are coupled through a second interstage coupling transformer 32 to the control grid of a second I. F. amplifier tube 33 in the amplifier 12 wherein they are further amplified and coupled through the interstage transformer 34 to the control grid of the final amplifier tube 35 in the amplifier 12, the output from the tube 35 being coupled through the interstage transformer 36 to the control grid of the second detector tube 37. It will be understood that the primary and secondary circuits of the coupling transformers 30, 32, 34 and 36 are suitably tuned to a nominal center IF frequency of, for example, 40 mc., and have a sufficiently wide pass band to transmit both the video and sound carriers in the ratio of approximately twenty-to-one for correct intercarrier sound operation, as will be readily understood by those skilled in the art. In the detector 13 a video signal is developed across the resistor 40 which inherently includes a 4.5 mc. beat note component produced by heterodyning action between the video and sound carriers in the detector 13. This 4.5 mc. beat note component must be removed from the video signal in order to prevent an objectionable cross-hatch pattern from being developed in the reproduced picture.

In order selectively to develop a 4.5 mc. intercarrier sound signal which may be used for sound detection, the anode circuit of the detector tube 35 is provided with a coupling transformer 41 the primary and secondary circuits of which are tuned to 4.5 mc. and are of sufficiently wide band width to pass the frequency modulated side band components of the 4.5 mc. intercarrier sound I. F. signal which represent the desired sound signal. Since the 4.5 mc. intercarrier sound signal is derived from the anode circuit of the tube 37, a substantial amplification of the 4.5 mc. signal is provided. In accordance with the present invention, the secondary winding 42 of the 4.5 mc. coupling transformer 41 is connected in series with the secondary winding 43 of the interstage coupling transformer 34 to the control grid of the third amplifier tube 35 in the common video and sound I. F. amplifier 12 so that the tube 35 continuously amplifies both the video and sound I. F. carrier signals and the 4.5 mc. intercarrier sound signal. However, since the nominal center frequency of the interstage coupling transformer 34 is of the order of 40 mc. and the nominal center frequency of the transformer 41 is 4.5 mc., the transformer 34 has very little impedance at 4.5 mc. and the 4.5 mc. tuned winding 43 has very little impedance at 40 mc. so that relatively little interaction between these signals of widely different frequencies is experienced even though they are both amplified through the tube 35. In the anode of the circuit tube 35 the primary winding 44 of the interstage coupling transformer 34 which is tuned to 40 mc. is connected in series with the primary winding 45 of a 4.5 mc. coupling transformer 46 to the B+ supply so that the video and sound I. F. carrier signals are developed across the winding 44 and the 4.5 mc. intercarrier sound signal is developed across the winding 45. Accordingly, the 4.5 mc. signal which is coupled to the control grid of the tube 35 from the winding 42 is amplified in this tube and appears in amplified form across the secondary winding 47 of the 4.5 mc. coupling transformer 46, the 4.5 mc. gain provided in the second detector tube 37 and the I. F. amplifier tube 35 being equivalent to the gain in the intercarrier sound channel of a conventional receiver.

The amplified 4.5 mc. signal which is developed across the winding 47 is impressed upon the control grid of the limiter tube 50. In accordance with a further feature of the invention, the cathode circuit of the limiter tube 50 includes a series resonant circuit comprising the coil 51 and the condenser 52, the circuit 51, 52 being tuned to 4.5 mc. so that a relatively large amplitude 4.5 mc. signal is developed across the condenser 52 due to the high impedance of this condenser at series resonance. The amplitude of the voltage developed across the condenser 52 is controlled by means of a potentiometer 53 which is connected across the series resonant circuit 51, 52. The 4.5 mc. voltage developed across the condenser 52 is employed as a cancelltaion signal to remove the undesired 4.5 mc. component from the video signal produced by the amplifier 14, as described in detail in my above-identified copending application. Thus, the voltage which appears between the terminal A and ground is coupled through a phase shifting network comprising the shunt condensers 54 and 55 and the series inductance 56, the network 54, 55 and 56 being designed in accordance with the procedure described in my above-identified copending application to provide a suitable phase shift of the 4.5 mc. cancellation signal developed at the terminal A so that this signal is of the same phase as the 4.5 mc. beat note component of the video signal supplied to the cathode of the picture tube 15. This phase shifted 4.5 mc. cancellation signal is impressed upon the control grid of the picture tube 15 so as to remove the undesired 4.5 mc. beat note component from the video signal without producing phase distortion of the other frequency components of the video signal so that the transient response of the video amplifier is not impaired and fine detail of the reproduced picture is achieved without overshoot or ringing effects, as described in detail in my above-identified copending application.

As discussed above, the secondary winding 60 of the tuned coupling transformer 36 which connects the amplifier tube 35 and the detector tube 37 has relatively little impedance at 4.5 mc. since this secondary winding is tuned to a nominal center I. F. frequency of either 25 mc. or 40 mc. However, a small amplitude 4.5 mc. signal may be developed across the secondary winding 60 and be coupled to the detector tube 37 so as to produce an increase in the amplitude of the undesired 4.5 mc. beat note component in the video signal. However, in accordance with the present invention a relatively large beat note component may be completely removed from the video signal without requiring a phase distorting frequency selective trap circuit by providing the above-described 4.5 mc. cancellation circuit wherein the amplitude of the 4.5 mc. cancellation signal may be adjusted over a wide range to equal the amplitude of the undesired beat note component in the video signal so that complete cancellation is achieved even though the 4.5 mc. intercarrier sound signal is amplified through the I. F. amplifier tube 35.

In order to adjust the amplitude of the video signal which is impressed upon the cathode of the picture tube 15, it is necessary to provide a gain control arrangement which will not effect the cancellation of the undesired 4.5 mc. beat note component so that an objectionable crosshatch pattern will not be produced as the amplitude of the video signal is adjusted to conform to varying background lighting conditions. In accordance with an important feature of the present invention the video gain adjustment may be made while maintaining cancellation of the undesired 4.5 mc. beat note component and also while providing a reflex amplifier arrangement which is used as one signal path of the 4.5 mc. signal so that the advantages of the double path cancellation signal system may be obtained while employing a minimum number of tubes in the receiver. More particularly, the keyed AGC circuit 16 is provided with a variable output circuit including the potentiometer 70 and the variable AGC voltage produced at the arm of the potentiometer 70 is coupled through the resistor 71 and the secondary winding 72 of the coupling transformer 30 to the control grid of the first common I. F. amplifier tube 31. This AGC voltage is also coupled through the resistor 73 and the secondary winding 74 of the coupling transformer 32 to the second common I. F. amplifier tube 33. With this arrangement, the gain of the amplifier tubes 31 and 33 may be manually adjusted for contrast control purposes by varying the position of the arm of the potentiometer 70. However, during such contrast control adjustment the gain of the amplifier tube 35, which is employed to amplify both the video and sound I. F. carrier signals and the 4.5 mc. intercarrier sound signal, is not varied so that the amplification of the 4.5 mc. intercarrier sound signal remains constant despite contrast control adjustments. As a result, removal of the 4.5 mc. beat note component from the video signal is continuously obtained while permitting adjustment in the contrast of the reproduced picture.

In this connection, it is pointed out that the detector tube 37 has a relaively high input impedance so that the detector stage 13 has practically no effect upon the response characteristics of the last I. F. amplifier tube 35 in the amplifier 12. Accordingly, the last amplifier tube 35 may be used to amplify both the video and sound I. F. carrier signals and the 4.5 mc. intercarrier sound signal, since the coupling transformer 36 is substantially unaffected by the succeeding detector stage, and the AGC voltage may be applied to the first and second amplifier tubes 31 and 33 so that the gain through the amplifier 12 may be controlled to prevent overloading and cross modulation between the various signals transmitted through the amplifier 12. However, it will be understood that a conventional detector of the diode rectifier type may be employed as the detector 13 in the event that the addition gain for the 4.5 mc. intercarrier sound signal which is provided by the tube 37 is not required. If a diode detector is used, it is necessary to control the last I. F. tube 35 by the AGC voltage since the response characteristics of the last I. F. stage will be affected by the diode detector, and to employ the second I. F. tube 33 as the 4.5 mc. reflex amplifier stage since the reflex amplifier stage should not be AGC controlled for the reasons discussed in detail above. Such an arrangement has the additional disadvantage that the AGC voltage is not applied to the first two I. F. stages so that overloading and cross modulation may arise. It will also be understood that a suitable 4.5 mc. trap circuit may be employed in the video amplifier 14 to remove the undesired 4.5 mc. beat note component in the event that phase distortion of the other video signal component can be tolerated, and the amplifier tube 35 may still be employed to provide amplification of the 4.5 mc. intercarrier sound signal in the manner described in detail above.

In Fig. 2 of the drawings there is shown a color television receiver wherein the chrominance information, which comprises the color subcarrier modulation components, may be amplified through at least one of the common video and sound carrier I. F. stages of the receiver to provide a substantially simplified color television receiving arrangement. In addition, the 4.5 mc. intercarrier sound signal may also be amplified through a portion of the common video and sound carrier I. F. amplifier of the color television receiver in a manner similar to that described in detail above in connection with the monochrome television receiver in Fig. 1. Referring now to Fig. 2, color television signals which are intercepted by the antenna system 100 are converted into corresponding intermediate frequency signals in the tuner 101 and these intermediate frequency signals are amplified in a combined video and sound carrier I. F., 4.5 mc. intercarrier sound and chroma amplifier 102. The output of the amplifier 102 is connected to a second detector 103 wherein the luminance video signal is detected and is supplied to the E'$_Y$ video amplifier 104 to provide the desired luminance signal. In the video amplifier 104 a deflection synchronizing signal is coupled to the deflection synchronizing and keyed AGC circuit 105 which latter circuit provides separated horizontal and vertical synchronizing signals for the horizontal and vertical deflection circuits 106 so as to produce the conventional vertical and horizontal scanning waves in the coils 107 and 108 which surround the neck of the color picture tube 109. A 3.58 mc. color burst synchronizing signal is also derived from the video amplifier 104 and is supplied to the color synchronization circuit 110, which includes a suitable color burst amplifier, phase detector and reactance tube, for maintaining a 3.58 mc. crystal oscillator 111 in phase with the color burst signal so that the crystal oscillator output signals may be employed as reference signals for the color demodulators of the receiver.

In accordance with the present invention, both a 4.5 mc. intercarrier sound signal and a 3.58 mc. color subcarrier signal are derived from the second detector 103 and are amplified through a portion of the I. F. amplifier 102 so that substantial amplification of these signals is obtained without requiring separate amplifier stages therefor and without interfering with the intermediate frequency signals transmitted through the amplifier 102. The 4.5 mc. intercarrier sound signal which is reflex amplified in the amplifier 102 is then supplied to the 4.5 mc. limiter and discriminator 115 wherein the sound signals are derived from the 4.5 mc. intercarrier sound signal, the sound signals being amplified in the audio amplifier 116 and supplied to the loud speaker 117 of the color television receiver. The 3.58 mc. color subcarrier signal, i. e., the chroma signal, which is amplified in the I. F. amplifier 102 is coupled directly to the Q demodulator 120 and the I demodulator 121 of the color television receiver, the demodulators 120 and 121 being supplied with suitable reference signals from the crystal oscillator 111 so as to provide the conventional I and Q color difference signals. The positive and negative output signals from the demodulators 120, 121 are supplied to the matrices 125 and the luminance signal output of the amplifier 104 is also supplied to the matrices 125 so as to combine the color difference signals with the luminance signal in the red adder circuit 126, the blue adder circuit 127, and the green adder circuit 128, the outputs of the circuits 126, 127 and 128 being supplied to the corresponding control grids of the red, blue and green electron guns of the color picture tube 109.

Considering now in more detail the I. F. amplifier 102, this amplifier includes the cascade connected amplifier tubes 135, 136, 137 and 138 to which are supplied the video and sound carrier intermediate frequency signals through the coupling transformers 140, 141, 142 and 143. The I. F. output of the last amplifier tube 138 is coupled to the detector tube 145 of the detector 103 through the coupling transformer 146. The gain of the first two tubes 135 and 136 of the amplifier 102 is controlled by an AGC voltage which is developed across the potentiometer 105*a* in the keyed AGC portion of the circuit 105. Thus, the AGC voltage developed at the arm of the potentiometer 105*a* is coupled through the resistor 147 and the secondary of the transformer 140 to the control grid of the tube 135 and through the resistor 148 and the secondary of the transformer 141 to the control grid of the tube 136 so as to provide contrast control, as described in detail above in connection with the system of Fig. 1. In this connection it will be understood that the coupling transformers 140 to 143, inclusive, and 146 are each provided with a suitable band pass characteristic such that the video, color subcarrier and sound carrier intermediate frequency signals are all transmitted therethrough.

In the second detector 103, the detector tube 145 is operated as a high input impedance detector and is provided with a large cathode resistor 150 across which the luminance video signal is developed due to the operation of the tube 145 in the non-linear region of the grid plate characteristic of the tube 145. The luminance signal developed across the resistor 150 is coupled through the condenser 151 to the first video amplifier tube 152 in the video amplifier 154, the output of the tube 152 being delayed in the delay line 153 so that the E'$_Y$ signal can be correctly added to the color difference signals in the matrices 125, as will be readily understood by those skilled in the art. The synchronizing signal portion of the video wave is derived from the anode circuit of the tube 152 and is coupled through the condenser 154 to the deflection synchronizing circuit 105 so as to maintain the scanning waves in the coils 107 and 108 in synchronism with the received television signal. The E'Y signal delayed in the delay line 153 is further amplified in the second video amplifier tube 154, the output of which is directly coupled to the matrices 125. In order to synchronize the color synchronization circuit 110, the color burst synchronizing signal is derived from the anode circuit of the first video amplifier tube 152 by means of the transformer 155, which is tuned to 3.58 mc. and selects the color burst synchronizing portion of the received color television signal and supplies the same to the color sync circuit 110.

In accordance with the present invention a 4.5 mc. intercarrier sound signal is derived from the anode circuit of the detector tube 145 by means of the tuned transformer 160 and a 3.58 mc. color subcarrier signal is derived from the anode circuit of the detector tube 145 by means of the tuned transformer 161. The secondary winding 162 of the transformer 160 and the secondary winding 163 of the transformer 161 are connected in series with the secondary winding 164 of the coupling transformer 142 so that both the 4.5 mc. intercarrier sound signal and the 3.58 mc. color subcarrier signal are impressed upon the control grid of the third I. F. amplifier tube 137 in the amplifier 102. Accordingly, the amplifier tube 147 amplifies the wide band video and sound carrier intermediate frequency signal, which has a nominal center frequency of perhaps 40 mc., the narrow band 4.5 mc. intercarrier sound signal and the relatively wide band 3.58 mc. color subcarrier signal, the anode circuit of the tube 137 being provided with a 4.5 mc. coupling transformer 170 and a 3.58 mc. coupling transformer 171 the secondaries of which are connected in series with the secondary of the coupling transformer 143 to supply all of the above signals to the control grid of the last I. F. amplifier tube 138 in the amplifier 102.

In this connection it will be noted that the chrominance signal, like the intercarrier sound signal, comprises a modulated carrier wave even though the carrier itself is suppressed so that the average value of the chrominance signal does not change. Accordingly, the chrominance signal can be amplified through the same tubes which are employed for amplification of the I. F. signal without developing any D. C. component which would tend to produce cross modulation and interaction between these different signals when amplified through the same tube. Thus, even during white signal periods when modulation of the color subcarrier is zero, no D. C. component is developed so that the D. C. potentials of the control grids of the I. F. amplifier tubes 137 and 138 are not affected by either the intercarrier sound signal, which consists of a frequency modulated 4.5 mc. carrier, or the chrominance signal which consists of 3.58 mc. color subcarrier modulation components.

The anode circuit of the tube 138 is provided with a 4.5 mc. coupling transformer 175 and a 3.58 mc. coupling transformer 176, the primaries of which are connected in series with the primary of the coupling transformer 146 so that the respective signals described above are developed in amplified form across the secondary windings of the transformers 146, 175 and 176. One end of the secondary winding 177 of the 4.5 mc. transformer 175 is connected to ground and the other end of the winding 177 is connected to the 4.5 mc. limiter 115. It will thus be evident that the 4.5 mc. intercarrier sound signal is first amplified in the detector tube 145 and is thereafter amplified through both the I. F. amplifier tube 137 and the I. F. amplifier tube 138 before being supplied to the 4.5 mc. limiter 115. One end of the secondary winding 178 of the 3.58 mc. transformer 176 is connected to ground, the other end of the winding 178 being connected to the color demodulators 120 and 121. In this connection it will be understood that the coupling transformers 171 and 176 have a band pass characteristic of from 2 to 4 mc. so as to pass the upper and lower sidebands of the 3.58 mc. color subcarrier.

In order to remove the undesired 4.5 mc. and 3.58 mc. components from the luminance signal without introducing phase distortion of the other frequency components of this signal, suitable cancellation signals corresponding to the 4.5 mc. and 3.58 mc. components may be developed in the manner described in detail in my above identified copending application. More particularly, for the 4.5 mc. cancellation signal, the limiter 115 may be provided with a 4.5 mc. pick-off circuit, such as described in detail in connection with the limiter 25 of Fig. 1, so that a 4.5 mc. cancellation signal is developed at the terminal A of the limiter 115 and is shifted in phase by means of a shifting network 195 so that the cancellation signal is 180° out of phase with the 4.5 mc. beat note component of the luminance signal. This cancellation signal is coupled through the mixing resistor 196 to the output conductor 203 of the video amplifier 154. In a similar manner a 3.58 mc. cancellation signal is derived by coupling the output from the 3.58 mc. transformer 176 through the isolating resistor 197 to a series resonant circuit including the coil 198 and the condenser 199, the elements 198 and 199 being tuned to series resonance at 3.58 mc. Accordingly, at the arm of a potentiometer 200 which is connected across the condenser 199 there is produced a variable amplitude 3.58 mc. signal which is shifted in phase in the phase shifting network 201 and is coupled through the mixing resistor 202 to the luminance signal output conductor 203. The amplitudes and phase angles of the 4.5 mc. and the 3.58 mc. cancellation signals are adjusted so that they exactly cancel the corresponding components of the luminance signal with the result that these components do not appear in the color picture reproduced on the face of the color picture tube 109.

In this connection it will be understood that the above-described cancellation signals may be employed to remove the undesired components of the luminance signal in any desired manner. Thus, B—Y, R—Y and G—Y color difference signals are derived and are added to the luminance signal in the picture tube itself, instead of the illustrated I and Q demodulation system, the cancellation signals may either be mixed with the luminance signal at the control grids of the color picture tube or applied to the cathodes of the picture tube in parallel. However, it will be understood that if the cancellation signal is applied to the cathode and the luminance signal is applied to the control grid of the gun the cancellation signal should be of the same phase as the corresponding undesired component in the luminance signal, as shown in the monochrome system of Fig. 1.

In order to prevent a 920 kilocycle beat note from being developed in the detector 103 by heterodyning of the 4.5 mc. signal and the 3.58 mc. signal in this detector, there is provided an infinite rejection filter network indicated generally at 210, this network being connected between the secondary winding of the coupling transformer 146 and the control grid of the detector tube 145. The network 210 is tuned to provide a high degree of attenuation for the 4.5 mc. intercarrier sound signal although the network 210 readily transmits the video and sound intermediate frequency carriers which are developed across the secondary winding of the transformer 146. Accordingly, even though a small 4.5 mc. signal may be developed across the secondary of the transformer 146 due to amplification of the 4.5 mc. signal through the I. F. amplifier tubes 147 and 148, the filter network 210 removes this 4.5 mc. signal and prevents a 920 kilocycle beat note from being developed in the detector tube 145 so that no objectionable brightness bars are developed in the color picture reproduced on the face of the tube 109. In this connection it will be understood that while the receiver shown in Fig. 2 discloses the amplification of both the 4.5 mc. intercarrier sound signal and the 3.58 mc. color subcarrier signal through the same amplifier tubes of the amplifier 102, it is contemplated that these signals may be amplified through different I. F. amplifier tubes in the amplifier 102 or, in the alternative, only one of these signals can be reflex amplified through the amplifier 102, the other signal being amplified in a conventional manner in a separate channel. However, it will be understood that none of the I. F. amplifier tubes which are used for reflex amplification of either the 4.5 mc. signal or the 3.58 mc. signal should be controlled by the AGC voltage, otherwise overloading may occur and cross modulation between these signals may result, as described in more detail above in connection with the system of Fig. 1. It will also be noted that the particular second detector arrangement 103 described above has relatively little effect upon the response characteristics of the coupling transformer 146 so that the last I. F. amplifier tube or the last two amplifier tubes in the amplifier 102 may be employed for reflex amplification while impressing the AGC voltage on the first two tubes of the amplifier 102 so that overloading in the latter stages does not result. It will be understood that while the 3.58 mc. color subcarrier signal has been illustrated as being derived from the anode circuit of the detector tube 145 in order to provide gain for this signal, the color subcarrier signal can equally well be derived from the cathode circuit of the tube 145 by providing a suitable band pass coupling transformer the secondary of which may be connected in series with the secondary 162 of the 4.5 mc. coupling transformer 160. It will also be understood that reflex amplification of the 4.5 mc. intercarrier sound signal may be eliminated entirely in the event that conventional derivation of the 4.5 mc. intercarrier sound signal and amplification thereof is desired, in which case only the chroma, i. e., the color subcarrier signal would be reflex amplified through one or more of the I. F. amplifier stages of the amplifier 102 to provide the necessary gain for proper operation of the color demodulators 120 and 121.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States:

1. In a television receiver of the intercarrier sound type having a common video and sound carrier channel including a plurality of cascade connected amplifier stages, means for impressing a composite television signal on the input of said common channel, means for deriving said impressed television signal from the output of said common channel in amplified form, means for heterodyning and detecting the video and sound carriers of said amplified television signal to produce both a detected video signal and a sound modulated intercarrier signal, said sound modulated intercarrier signal having a carrier frequency equal to the frequency difference between said video and sound carriers, means for amplifying said sound modulated intercarrier signal through at least one of the stages of said common video and sound carrier channel, means for deriving the sound signal from said amplified sound modulated intercarrier signal, and means for passing said detected video signal to a picture reproducing device and said derived sound signal to a sound reproducing device.

2. In a television receiver of the intercarrier sound type having a common video and sound carrier channel including a plurality of cascade connected amplifier stages, means for impressing a composite television signal on the input of said common channel, means for deriving said impressed television signal from the output of said common channel in amplified form, means for heterodyning and detecting the video and sound carriers of said amplified television signal to produce both a detected video signal and a sound modulated intercarrier signal, said sound modulated intercarrier signal having a carrier frequency equal to the frequency difference between said video and sound carriers, means for impressing said sound modulated intercarrier signal on the input of one of said amplifier stages, means for deriving said sound modulated intercarrier signal from the output of said one stage in amplified form, means for developing an automatic gain control voltage proportional to said detected video signal, means for impressing said automatic gain control voltage on at least one of said amplifier stages other than said one amplifier stage to control the gain thereof in accordance with changes in the strength of said composite television signal, means for deriving the sound signal from said amplified sound modulated intercarrier signal, and means for passing said detected video signal to a picture reproducing device and said derived sound signal to a sound reproducing device.

3. In a television receiver of the intercarrier sound type having a common video and sound carrier channel including a plurality of cascade connected amplifier stages, means for impressing a composite television signal including an amplitude modulated video signal carrier and a related frequency modulated sound signal carrier on the input of said common channel, means for deriving said impressed television signal from the output of said common channel in amplified form, means for heterodyning and detecting the video and sound carriers of said amplified television signal to produce both a detected video signal and a sound modulated intercarrier signal, said sound modulated intercarrier signal having a carrier frequency equal to the frequency difference between said video and sound carriers, means for amplifying said sound modulated intercarrier signal through at least one of the stages of said common video and sound carrier channel, means including amplitude limiter means connected to the output of said one stage for deriving the sound signal from said amplified sound modulated intercarrier signal, and means for passing said detected video signal to a picture reproducing device and said derived sound signal to a sound reproducing device.

4. In a television receiver of the intercarrier sound type having a common video and sound carrier channel including a plurality of cascade connected amplifier stages, means for impressing a composite television signal on the input of said common channel, means for deriving said impressed television signal from the output of said common channel in amplified form, means for heterodyning and detecting the video and sound carriers of said amplified television signal to produce both a detected video signal and a sound modulated intercarrier signal, said sound modulated intercarrier signal having a carrier frequency equal to the frequency difference between said video and sound carriers, said detected video signal including an intercarrier beat note component similar to said sound modulated intercarrier sound signal, means for amplifying said detected video signal without substantial phase distortion of the frequency components thereof, means for amplifying said sound modulated intercarrier signal through at least one of the stages of said common video and sound carrier channel, means for mixing said amplified sound modulated intercarrier signal and said amplified video signal to remove the intercarrier beat note component of said amplified video signal, means for deriving the sound signal from said amplified sound modulated intercarrier signal, means for modulating the beam of a cathode ray tube picture reproducing device with the output of said mixing means, and means for passing said derived sound signal to a sound reproducing device.

5. In a television receiver of the intercarrier sound type having a common video and sound carrier channel including a plurality of cascade connected amplifier stages, means for impressing a composite television signal on the input of said common channel, means for deriving said impressed television signal from the output of said common channel in amplified form, means for heterodyning and detecting the video and sound carriers of said amplified television signal to produce both a detected video signal and a sound modulated intercarrier signal, said sound modulated intercarrier signal having a carrier frequency equal to the frequency difference between said video and sound carriers, said detected video signal including an intercarrier beat note component similar to said sound modulated intercarrier sound signal, means for amplifying said detected video signal without substantial phase distortion of the frequency components thereof, means for amplifying said sound modulated intercarrier signal through at least one of the stages of said common video and sound carrier channel, means for deriving from said amplified sound modulated intercarrier signal a cancellation signal of the same amplitude as the beat note component of said amplified video signal, and means for mixing said cancellation signal and said amplified video signal in the proper phase to remove said beat note component from said amplified video wave without introducing phase distortion of the other frequency components thereof.

6. In a television receiver of the intercarrier sound type having a common video and sound carrier channel including a plurality of cascade connected amplifier stages, means for impressing a composite television signal on the input of said common channel, means for deriving said impressed television signal from the output of said common channel in amplified from, means for heterodyning and detecting the video and sound carriers of said amplified television signal to produce both a detected video signal and a sound modulated intercarrier signal, said sound modulated intercarrier signal having a carrier frequency equal to the frequency difference between said video and sound carriers, said detected video signal including an intercarrier beat note component similar to said sound modulated intercarrier sound signal, means for amplifying said detected video signal without substantial phase distortion of the frequency components thereof, means for amplifying said sound modulated intercarrier signal through at least one of the stages of said common video and sound carrier channel, a cathode ray tube picture reproducing device, means for impressing said amplified video signal on a control electrode of said cathode ray tube, means for deriving from said amplified sound modulated intercarrier signal a cancellation signal of the same amplitude and phase as the beat note component of the amplified video signal impressed upon said control electrode, means for impressing said cancellation signal on another control electrode of said cathode ray tube to remove said beat note component from the reproduced picture, and means for deriving the sound signal from said amplified sound modulated intercarrier signal and impressing said sound signal on a sound reproducing device.

7. In a television receiver of the intercarrier sound type having a common video and sound carrier channel including a plurality of cascade connected amplifier stages, means for impressing a composite television signal on the input of said common channel, means for deriving said impressed television signal from the output of said common channel in amplified form, means for heterodyning and detecting the video and sound carriers of said amplified television signal to produce both a detected video signal and a sound modulated intercarrier signal, said sound modulated intercarrier signal having a carrier frequency equal to the frequency difference between said video and sound carriers, said detected video signal including an intercarrier beat note component similar to said sound modulated intercarrier sound signal, means for amplifying said detected video signal without substantial phase distortion of the frequency components thereof, means for impressing said sound modulated intercarrier signal on the input of one of said amplifier stages, means for deriving said sound modulated intercarrier signal from the output of said one stage in amplified form, means for developing an automatic gain control voltage proportional to said detected video signal, means for impressing said automatic gain control voltage on at least one of said amplifier stages other than said one stage to control the gain thereof, means for mixing said amplified sound modulated intercarrier signal and said amplified video signal to remove the intercarrier beat note component of said amplified video signal, means for deriving the sound signal from said amplified sound modulated intercarrier signal, means for modulating the beam of a cathode ray tube picture reproducing device with the output of said mixing means, and means including contrast control means for manually adjusting the automatic gain control voltage applied to said controlled stages, thereby to vary the video output of said mixing means while preventing said beat note component from appearing in the reproduced picture.

8. In a television receiver of the intercarrier sound type having a common video and sound carrier channel including a plurality of cascade connected amplifier stages, means for impressing a composite television signal on the input of said common channel, means for deriving said impressed television signal from the output of said common channel in amplified form, means for heterodyning and detecting the video and sound carriers of said amplified television signal to produce both a detected video signal and a sound modulated intercarrier signal, said sound modulated intercarrier signal having a carrier frequency equal to the frequency difference between said video and sound carriers, said detected video signal including an intercarrier beat note component similar to said sound modulated intercarrier sound signal, means for amplifying said detected video signal without substantial phase distortion of the frequency components thereof, means for impressing said sound modulated intercarrier signal on the input of one of said amplifier stages, means for deriving said sound modulated intercarrier signal from the output of said one stage in amplified form, means for developing an automatic gain control voltage proportional to said detected video signal, means for impressing said automatic gain control voltage on at least one of said amplifier stages other than said one stage to control the gain thereof, a cathode ray tube picture reproducing device, means for impressing said amplified video signal on a control electrode of said cathode ray tube, means for deriving from said amplified sound modulated intercarrier signal a cancellation signal of the same amplitude and phase as the beat note component of the amplified video signal impressed upon said control electrode, means for impressing said cancellation signal on another control electrode of said cathode ray tube to remove said beat note component from the reproduced picture, means for deriving the sound signal from said amplified sound modulated intercarrier signal, and means including contrast control means for manually adjusting the automatic gain control voltage applied to said controlled stages while maintaining the relative amplitudes of said cancellation signal and said beat note component the same so that the amplitude of the video signal impressed upon said one control electrode may be varied without causing said beat note component to appear in the reproduced picture.

9. In a color television receiver of the type having an intermediate frequency amplifier channel including a plurality of cascade connected amplifier stages, means for impressing a composite color television signal on the input of said channel, said composite color television signal including a picture carrier having luminance modulation components and color subcarrier modulation components, means for detecting said luminance modulation components, means for detecting said color subcarrier modulation components, means for amplifying said detected color subcarrier modulation components through at least one of the stages of said intermediate frequency amplifier channel, and means controlled in part by said detected luminance modulation components and said amplified color subcarrier modulation components for producing a color television picture.

10. In a color television receiver of the type having an intermediate frequency amplifier channel including a plurality of cascade connected amplifier stages, means for impressing a composite color television signal on the input of said channel, said composite color television signal including a picture carrier having luminance modulation components and color subcarrier modulation components, means for detecting said luminance modulation components, means for detecting said color subcarrier modulation components, means for impressing said detected color subcarrier modulation components on the input of one of said amplifier stages, means for deriving said detected color subcarrier modulation components from the output of said one stage in amplified form, means for developing an automatic gain control voltage proportional to said detected luminance modulation components, means for impressing said automatic gain control voltage on at least one of said amplifier stages other than said one amplifier stage to control the gain thereof in accordance with changes in the strength of said composite color television signal, and means controlled in part by said detected luminance modulation components and said amplified color subcarrier modulation components for producing a color television picture.

11. In a color television receiver of the type having an intermediate frequency amplifier channel including a plurality of cascade connected amplifier stages, means for impressing a composite color television signal on the input of said channel, said composite color television signal including a picture carrier having luminance modulation components and color subcarrier modulation components, means for detecting said luminance modulation components, means for detecting said color subcarrier modulation components, said detected luminance modulation components including a color subcarrier signal similar to said detected color subcarrier modulation components, means for amplifying said detected color subcarrier modulation components through at least one of said amplifier stages, means for amplifying said detected luminance modulation components without substantial phase distortion of the frequency components thereof, means for mixing said amplified luminance modulation components and said amplified color subcarrier modulation components in the correct phase to remove said color subcarrier signal from said amplified luminance modulation components, and means controlled in part by amplified luminance modulation components and said amplified color subcarrier modulation components for producing a color television picture.

12. In a color television receiver of the type having an intermediate frequency amplifier channel including a plurality of cascade connected amplifier stages, means for impressing a composite color television signal on the input of said channel, said composite color television signal including a picture carrier having luminance modulation components and color subcarrier modulation components, means for detecting said luminance modulation components, means for detecting said color subcarrier modulation components, said detected luminance modulation components including a color subcarrier signal similar to said detected color subcarrier modulation components, means for amplifying said detected color subcarrier modulation components through at least one of said amplifier stages, means for amplifying said detected luminance modulation components without substantial phase distortion of the frequency components thereof, means for deriving from said amplified color subcarrier modulation components a color subcarrier cancellation signal of the same amplitude as the color subcarrier signal portion of said amplified luminance modulation components, means for mixing said cancellation signal and said amplified luminance modulation components, in the correct phase to remove said color subcarrier signal from said amplified luminance modulation components, and means controlled in part by amplified luminance modulation components and said amplified color subcarrier modulation components for producing a color television picture.

13. In a color television receiver of the type having an intermediate frequency amplifier channel including a plurality of cascade connected amplifier stages, means for impressing a composite color television signal on the input of said channel, said composite color television signal including a picture carrier having luminance modulation components and color subcarrier modulation components and a sound carrier spaced from said picture carrier by a predetermined frequency difference, means for detecting said luminance modulation components, means for detecting said color subcarrier modulation components, means for heterodyning said picture and sound carriers to produce a sound modulated intercarrier signal, means for amplifying said detected color subcarrier modulation components through at least one of said amplifier stages, means for amplifying said intercarrier sound signal through at least one of said amplifier stages, means for deriving the sound signal from said amplified intercarrier sound signal, and means controlled in part by said detected luminance signal and said amplified color subcarrier modulation components for producing a color television picture.

14. In a color television receiver of the type having an intermediate frequency amplifier channel including a plurality of cascade connected amplifier stages, means for impressing a composite color television signal on the input of said channel, said composite color television signal including a picture carrier having luminance modulation components and color subcarrier modulation components and a sound carrier spaced from said picture carrier by a predetermined frequency difference, means for detecting said luminance modulation components, means for detecting said color subcarrier modulation components, means for heterodyning said picture and sound carriers to product a sound modulated intercarrier signal, means for amplifying said detected color subcarrier modulation components through at least one of said amplifier stages, means for amplifying said intercarrier sound signal through at least one of said amplifier stages, means for deriving an intercarrier cancellation signal from said amplified intercarrier sound signal, means for deriving a color subcarrier cancellation signal from said amplified color subcarrier modulation components, means for amplifying said detected luminance signal, and means for mixing said cancellation signals and said amplified luminance signal to remove corresponding intercarrier and color subcarrier signals from said amplified luminance signal without producing phase distortion of the other frequency components of said luminance signal.

References Cited in the file of this patent

Emerson Television Preliminary Service Note; Model 1030D; July 1954.